April 24, 1945. J. P. KANE 2,374,211
WIRE AND CABLE STRIPPING MACHINE
Filed Aug. 26, 1944

INVENTOR
JOSEPH P. KANE
BY
ATTORNEY

Patented Apr. 24, 1945

2,374,211

UNITED STATES PATENT OFFICE 2,374,211

WIRE AND CABLE STRIPPING MACHINE

Joseph P. Kane, Charleston, S. C.

Application August 26, 1944, Serial No. 551,411

3 Claims. (Cl. 164—39)

(Granted under the act of March 3, 1883, as amended April 30, 1928; 370 O. G. 757)

This invention relates to a wire or cable stripping machine and has for an object to provide an improved device for the purpose of removing lead, rubber, or other types of covering from wires or cables.

A further obect of this invention is to provide a wire stripping machine capable of easy and quick adjustment for operating on wires or cables of various diameters.

A still further object of this invention is to provide a wire stripping machine which is power operated for feeding the wire or cable therethrough as the same is being operated upon, to slit the covering at a rapid rate thereby making it extremely serviceable for separating the wire or cable into its various components which may afterward be readily segregated for salvage.

It is a further object of this invention to provide a wire stripping machine which has means for positively feeding the wire or cable therethrough and has means for positively adjusting the depth of cut to be made in the wire covering.

With the foregoing and other objects in view, the invention consists in the construction, combination and arrangement of parts hereinafter described and illustrated in the drawing, in which.

Figures 1, 2:
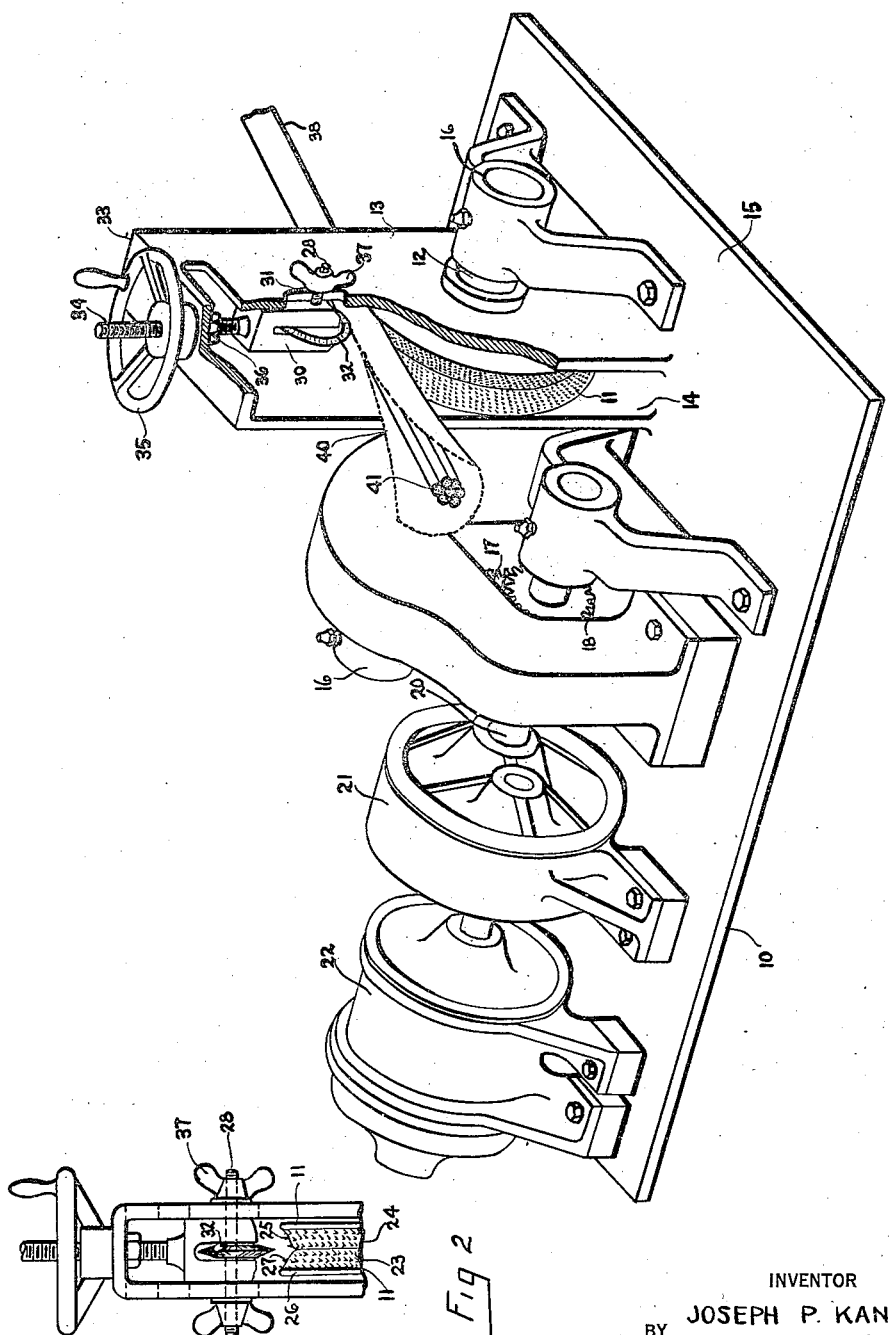
Fig. 1 is a perspective of the device of this invention.
Fig. 2 is a fragmentary detailed view.

There is shown at 10 the wire stripping machine of this invention, which includes a sheave 11 mounted on a shaft 12, which is journaled through the sides of an inverted U-frame 13, which is welded or otherwise secured as at 14 to a base 15. The ends of the shaft 12 are supported in bearings 16 mounted on the base 15. A gear 17 is keyed on the shaft 16 and meshes with a gear 18 on a shaft 20 forming part of a gear reduction train 21 from a motor 22, all mounted on base 15, so that the sheave 11 may be rotated at a suitable speed by the motor 22. The rim 23 of the sheave 11 is shaped as shown in Fig. 2 the center of the rim being formed in a V 24, the edges of the V 24 merging into somewhat concave portions 25 terminating at the edges 26 of the sheave 11. Extending upwardly and circumferentially in the direction of rotation only, about the concave portions 25 of the rim 23, are a plurality of series of rasps 27. The rim 23 may be up to two inches or more in width between the edges 26 according to the diameter of the wire or cable that is to be operated on. Journaled on a shaft 28 extending through a block 30 and through slots 31 in the opposite sides of the U-frame 13 is a rotatable cutter 32, the shaft 28 being vertically above the sheave shaft 12. Extending upwardly through the bight 33 of the U-frame 13 is a screw 34 provided with a wheel nut 35 above the bight 33 and a locking nut 36 below the bight 33. The ends of the shaft 28 are threaded to receive locking wing nuts 37.

In operation, a wire or cable 38, in which it is desired to separate the covering 40 from the interior wires 41, is fed to the rim 23 of the sheave 11. The wing nuts 37 and locking nut 36 being loose, the wheel nut is used to adjust the rotatable cutter 32 so as to make the distance between its cutting edge and the rim 23 such that it will just cut through and slit the cable covering 40 without damaging the wires 41. When at this proper distance, the locking nut 36 and wing nuts 37 are tightened to hold it in such position. The motor 22 is then operated to cause the sheave 11 to rotate, whereupon the rasps 27 will positively grip and feed the cable 38 through the space underneath the rotating cover 32 thereby separating the cover 40 from the wires 41. When a cable of a different diameter is to be operated on, the position of the knife 32 is adjusted accordingly. If a very fine wire is being operated upon, it will fit in the V 24 of rim 23 and with proper adjustment of the blade 32, the operation will be identical.

Other modifications and changes in the number and proportions of the parts may be made by those skilled in the art without departing from the nature of this invention within the scope of what is hereinafter claimed.

The invention described herein may be manufactured and used by or for the Government of the United States of America for governmental purposes without the payment of any royalties thereon or therefor.

What is claimed is:

1. A wire and cable stripping machine comprising a rotatable sheave having a rim adapted to receive a small wire or large cable thereon, forwardly pointing rasps on the outer portions of said rim for temporarily gripping the large cable, a V-shaped center in said rim for temporarily gripping the small wire, a rotatable cutter and means for adjustably mounting said cutter in relation to said rim sheave whereby a small wire or large cable between said sheave rim and said cutter will be gripped and fed by said rotating sheave beneath said rotating cutter to slit the cover of said wire or cable, a U-frame in which said sheave is journaled, a block, a shaft in said block on which said rotatable cutter is journaled, a screw extending from said block through the bight of said U-frame and a nut for adjusting said screw and block relative to said U-frame to thus adjust the distance between said cutter and said sheave.

2. A wire and cable stripping machine comprising a rotatable sheave having a V-shaped center merging into a somewhat concave rim adapted to receive a small wire or large cable thereon, forwardly pointing rasps on said concave rim for temporarily gripping the large cable, the V-shaped center being adapted for temporarily gripping the small wire, a rotatable cutter and means for adjustably mounting said cutter in relation to said rim sheave whereby a small wire or large cable between said sheave rim and said cutter will be gripped and fed by said rotating sheave beneath said rotating cutter to slit the cover of said wire or cable, a U-frame in which said sheave is journaled, a block, a shaft in said block on which said rotatable cutter is journaled, a screw extending from said block through the bight of said U-frame and a nut for adjusting said screw and block relative to said U-frame to thus adjust the distance between said cutter and said sheave, said shaft extending through said block on which said cutter is journaled and also extending through slots in the sides of said U-frame, the ends of said cutter shaft being threaded, and nut means on the end of said cover shaft for locking said cutter shaft in adjusted position.

3. A wire and cable stripping machine comprising a rotatable sheave having a V-shaped center merging into a somewhat concave rim adapted to receive a small wire or large cable thereon, said V-shaped center being adapted to grip the small wire, forwardly pointing rasps on said concave rim for temporarily gripping the large cable, a rotatable cutter and means for adjustably mounting said cutter in relation to said rim sheave whereby a wire or cable between said sheave rim and said cutter will be gripped and fed by said rotating sheave beneath said rotating cutter to slit the cover of the small wire or large cable.

JOSEPH P. KANE